United States Patent [19]
Peterson

[11] Patent Number: 6,164,006
[45] Date of Patent: Dec. 26, 2000

[54] FISHING LURE WITH INTERCHANGEABLE TAIL

[76] Inventor: Lyle M. Peterson, 140 Putnam St., East Peoria, Ill. 61611

[21] Appl. No.: 09/337,415

[22] Filed: Jun. 22, 1999

[51] Int. Cl.[7] .................................................. A01K 85/00
[52] U.S. Cl. ....................... 43/42.09; 43/42.24; 43/42.28; 43/42.29
[58] Field of Search ............................... 43/42.09, 42.24, 43/42.28, 42.29, 42.35

[56] References Cited

U.S. PATENT DOCUMENTS

| | | |
|---|---|---|
| 2,207,425 | 7/1940 | Arbogast . |
| 2,254,949 | 9/1941 | Messacar . |
| 2,261,867 | 11/1941 | Arbogast . |
| 2,429,339 | 10/1947 | Arbogast . |
| 2,604,718 | 7/1952 | Crumb . |
| 2,958,152 | 11/1960 | Kyper . |
| 4,074,455 | 2/1978 | Williams, Jr. . |
| 4,887,377 | 12/1989 | Morris . |
| 4,953,319 | 9/1990 | Kasper et al. . |
| 4,959,920 | 10/1990 | Walker . |
| 5,301,453 | 4/1994 | Terrill . |
| 5,331,762 | 7/1994 | Banks ...................................... 43/42.09 |
| 5,381,620 | 1/1995 | Gibbs ...................................... 43/42.09 |
| 5,815,978 | 10/1998 | Huddleston ............................ 43/42.09 |

FOREIGN PATENT DOCUMENTS 594616  3/1960  Canada .
155479  12/1920  United Kingdom .

*Primary Examiner*—Jack W. Lavinder
*Attorney, Agent, or Firm*—Richard C. Litman

[57] ABSTRACT

A fishing lure includes a forward body portion with a removable and interchangeable tail portion. The tail portion may be interchanged quickly and easily in the field without tools and without incurring damage to the lure. In this manner, an angler may exchange the tail portion as desired for attracting different types of fish, and/or for fishing in different conditions. The forward body portion is preferably formed as a hollow plastic component, for flotation; other materials having similar properties may also be used. The tail portion is preferably formed of a soft, flexible material, such as silicone rubber as used in the manufacture of synthetic fishing baits such as worms and the like. The back of the forward body portion includes a generally vertical slot therein, with the slot having a circular cross section and a relatively narrow entrance. The forward end of the tail portion has a bulbed cross section extending therefrom, fitting tightly but removably within the slot of the body portion. Different tail portions may be impregnated with different fish attracting scent and/or taste substances as desired, and interchanged as desired to produce the desired fish attracting action. The forward end of the forward body portion includes a laterally symmetrical bill extending therefrom, with the bill including a forwardly directed cupped or concave area on each side of the flat attachment area. An eye or the like for the attachment of a fishing leader or line is provided in the upper center of the bill.

15 Claims, 3 Drawing Sheets

6,164,006

FISHING LURE WITH INTERCHANGEABLE TAIL

BACKGROUND OF THE INVENTION

1. Field of the Invention

The present invention relates generally to lures, bait, and other devices for attracting fish and game, and more specifically to various embodiments of a fishing lure in which the tail portion of the lure may be exchanged for different configurations. Different tail portions may have different appearances, and/or may be provided with different scents and/or flavors for attracting different types of fish under various conditions. The forward portion of the lure may include flotation means, a concave "bill" to produce turbulence and noise in the water to attract fish, and other lure features as desired.

2. Description of the Related Art

For most people, fishing and hunting have evolved from livelihood activities to sporting or recreational activities with the advance of civilization. As with most hobbies, those involved are interested in gaining the most recreational satisfaction from their time. In the sport of fishing, this means that the typical angler is interested in attracting and catching fish with the greatest efficiency possible.

Bait, lures, and the like have long been known as means for increasing one's catch, by attracting fish to the bait or lure and encouraging the fish to take the bait or lure and its accompanying hook. However, fish often are not attracted to various types of baits and lures, for various reasons. Accordingly, anglers have spent considerable effort in determining just which baits or lures attract various types of fish under various conditions.

One point of which practically all anglers are aware, is that different bait or lures are attractive to the same type of fish at different times, even in the same area. For this reason, most anglers will carry perhaps a few different types of bait (worms, salmon eggs, insects, etc.) and a number of different artificial lures, along with various additives which may be applied to the lures to enhance their scent or flavor to fish, whenever they go fishing. Such lures are generally integral units, with each having its own hook(s), leader attachment, etc., as required for the typical lure. The result is generally a relatively crowded and tangled tackle box, with most of the clutter comprising lures which are seldom used and which may not be used at all on any given fishing outing.

Accordingly, a need will be seen for a fishing lure having multiple interchangeable tail portions. The forward body portion of the lure is preferably formed of a relatively hard material, with the removable tail portions formed of a soft resilient material which is secured frictionally within a cooperating fitting in the forward body portion. The tail portions may be provided with different shapes, colors, scents, flavors, etc., to attract different types of fish, or fish under different conditions, while using the same forward body portion. The forward portion may include hook(s), leader attachment, flotation means, etc.

A discussion of the related art of which the present inventor is aware, and its differences and distinctions from the present invention, is provided below.

U.S. Pat. No. 2,207,425 issued on Jul. 9, 1940 to Fred A. Arbogast, titled "Artificial Fish Bait," describes a lure comprising a single body portion formed of a hard material (as is apparent from the screws inserted therein to attach various components thereto). The forward portion of the lure includes a laterally symmetrical "bill" extending to each side. This "bill" portion differs from the present lure, in that it is simply formed and has only a single lateral concave curvature thereacross. In contrast, the present lure bill has a separate concave curvature to each side of the central attachment area. In any case, the Arbogast lure has no separable tail component which may be interchanged according to conditions, as provided by the present lure.

U.S. Pat. No. 2,261,867 issued on Nov. 4, 1941 to Fred A. Arbogast, titled "Artificial Fish Bait," describes a lure similar to that of the '425 U.S. Patent to the same inventor, described immediately above. The '867 patent describes specific hook attachment means. The same distinctions noted above in the discussion of the '425, are felt to apply here as well.

U.S. Pat. No. 2,429,339 issued to Fred Arbogast on Oct. 21, 1947, titled "Hook Attachment For Artificial Bait," describes another hook attachment means similar to that disclosed in the '867 U.S. Patent to the same inventor, described immediately above. Again, the same points of distinction are seen to apply here, as none of the Arbogast lures have a double convex forward bill or a separable tail portion, as provided by the present fishing lure.

U.S. Pat. No. 2,604,718 issued on Jul. 29, 1952 to Neal S. Crumb, titled "Artificial Bait," describes a lure having a unitary solid body portion, with no interchangeable portions being provided. The front of the lure includes a "bill" component which is concavely dished to each side of the centerline. However, the Crumb lure is primarily adapted for bottom fishing, as shown in FIG. 1 of the Crumb patent. The angle of incidence of the "bill" portion with the body is negative, i. e., the forward edge is angled downwardly relative to the rest of the lure, in order to drive the forward end of the lure downwardly against the bottom when the lure is drawn through the water. Accordingly, the leader attachment eye is above and behind the "bill" portion, rather than at the front of the bill, as in the present lure. While Crumb also provides a lure embodiment having flotation, he must also provide for the rear portion of his lure to sink considerably below the forward portion, thus producing an unnatural attitude, in order to provide the proper angle of attack for the bill portion when the lure is drawn across the surface of the water. The present lure is adapted for flotation, and avoids such problems.

U.S. Pat. No. 2,958,152 issued on Nov. 1, 1960 to James G. Kyper, titled "Artificial Fish Lure," describes a lure having a frame to which hooks and leader attachment eye are secured, with different lure bodies being interchangeably attached to the frame. The lure bodies are formed of a hard and rigid material, in order to provide the required grip to each side of the frame portion. While Kyper discloses a double concave "bill," the bill is integrated with the frame, rather than the lure body. In any event, Kyper does not disclose any removable tail portion which is interchangeably attached to the main body portion of the lure, as in the present lure invention.

U.S. Pat. No. 4,074,455 issued on Feb. 21, 1978 to William O. Williams, Jr., titled "Fishing Lure," describes a lure having a forward body portion formed of a flexible, resilient material with a multitude of small pockets formed in the surface thereof. These pockets entrap air bubbles as the lure is immersed in water, to provide a shimmering appearance and to release air in a realistic manner. The tail portion is a flat, flexible material or a series of hair-like strands. In both cases, the tail is permanently affixed to the forward body portion, and cannot be exchanged in the field or without damaging the lure. Williams, Jr. does not disclose any form of "bill" for his lure, nor the removable attachment of a flexible, resilient tail portion removably attached to a rigid forward body portion, as provided by the present fishing lure invention.

U.S. Pat. No. 4,887,377 issued on Dec. 19, 1989 to John L. Morris, titled "Shad Type Fish Bait With Nose Cavity," describes a lure having an elongated, soft plastic body with a cavity for the insertion of a weight therein in the forward portion thereof. The entire lure is an integral component, with the forward portion and tail being formed of the same resilient material. No bill or the like is provided for producing turbulence along the surface of the water, as provided by the present invention, as the Morris lure is adapted for use beneath the surface for shad fishing, as opposed to the use of the present lure in attracting fish on or near the surface of the water.

U.S. Pat. No. 4,953,319 issued on Sep. 4, 1990 to John M. Kasper et al., titled "Multi-Attractant Fish Bait," describes a lure having a body formed as a single component of soft, flexible material. Pockets are formed within the body for removably holding sound and light producing elements, as desired. The tail portion of the Kasper et al. lure is not interchangeable or separable from the forward portion, as in the case of the present lure. The soft, resilient body portion of the Kasper et al. lure does not lend itself to the attachment of a rigid "bill" device thereto, as provided in the present fishing lure.

U.S. Pat. No. 4,959,920 issued on Oct. 2, 1990 to Wendall C. Walker, titled "Multi-Action Fishing Lure," describes a lure having forward and rearward portions each formed of a hard, rigid material. The two portions are movably linked together, but cannot be separated from one another in the field, as in the case of the present fishing lure. The front of the lure includes a pair of vanes extending laterally therefrom, but these differ from the bill of the present lure, in that the vanes of the Walker lure (1) angle forwardly and downwardly, which would tend to pull the lure beneath the surface, rather than lifting it atop the surface, as in the case of the present lure; and (2) the vanes of the Walker lure are flat and cannot produce any dynamic action due to curvature, as provided by the forward double concave curvature of the bill portion of the present lure.

U.S. Pat. No. 5,301,453 issued on Apr. 12, 1994 to Maurice W. Terrill, titled "Fish Lure With Interchangeable Body Section," describes a lure having forward and rearward components both formed of a soft, resilient plastic material. The rearward end of the forward portion has a tapered oval shape, with the forward end of the tail portion having a mating socket formed therein. The tail portion is worked onto the rearward end of the forward portion to secure it thereto. Additional security is provided by a hook attachment screw which is screwed through the wall of the socket of the tail portion and into the rearward portion of the forward body portion of the lure. However, the soft, resilient material of which the forward portion of the Terrill lure is formed, cannot provide substantial grip for such screw attachment means; the tail portion could be pulled from the forward portion in the event of a strike by a fish. Also, the bill of the Terrill lure is flat and is not angled to produce turbulence in the water, as in the case of the bill of the present fishing lure.

British Patent Publication No. 155,479 accepted on Dec. 23, 1920 to Margaret White, titled "Improved Phantom Minnow," describes a lure having an inflatable air bladder extending rearwardly from the head portion. While the bladder portion is flexible and the forward head portion is rigid, the rearward portion comprising the bladder is not removable from the forward head portion of the White lure. Moreover, the vanes extending laterally from the head comprise a spinner (line 43 of the disclosure), with the resultant spinning action not being desirable in the present fishing lure.

Finally, Canadian Patent Publication No. 594,616 issued on Mar. 22, 1960 to Raymond O. Tibbetts, titled "Fishing Lure," describes a spoon type lure having a thin curved body portion for producing an oscillating motion through the water. The spoon is formed of a thin, hard sheet of material, as indicated by the attachment of the hook thereto by means of a screw which is installed in a hole threaded into the spoon. No soft, resilient components are provided with the Tibbetts lure, either removably or permanently attached thereto. In addition, Tibbetts does not disclose any forward bill portion extending from the spoon, nor any flotation means for his lure. While the present lure may utilize a weed guard, as known in the art and disclosed in the Tibbetts Canadian Patent Publication, the present lure differs considerably from the hard, flat spoon configuration of Tibbetts.

None of the above inventions and patents, either singly or in combination, is seen to describe the instant invention as claimed.

SUMMARY OF THE INVENTION

The present invention comprises a fishing lure having a forward body portion and an interchangeable tail portion. The tail portion is removably securable to the body portion in the field, without need for tools and without incurring damage to the lure components. The present fishing lure allows anglers to exchange the tail portions of the lure as desired, to attract different types of fish and/or fish under different conditions.

The forward body portion of the lure is formed of a hollow shell of hard plastic or other suitable material providing similar flotation and other properties. The front end of the forward portion includes a bill extending therefrom, for producing turbulence in the water as the lure is drawn along the surface of the water. The bill is laterally symmetrical, and is preferably formed of a single sheet of material having a concave shape to each side of the flat central attachment area. Leader or fishing line attachment means extends from the upper central portion of the bill.

The removable rearward or tail portion of the lure is preferably formed of a soft, resilient material, such as silicone rubber, as is conventionally used in forming synthetic bait such as worms and the like. The tail portion may be impregnated with fish attracting scent and/or taste substances, if so desired. The tail includes a generally cylindrical bulbed shape along its forward end, which fits tightly but removably within a cooperating slot in the rearward portion of the forward body portion of the lure.

Accordingly, it is a principal object of the invention to provide an improved fishing lure comprising a forward body portion with an interchangeable tail portion extending therefrom.

It is another object of the invention to provide an improved fishing lure which forward body portion comprises a hollow shell formed of a hard plastic material, or other suitable material having similar properties for flotation.

It is a further object of the invention to provide an improved fishing lure which tail portion is formed of a soft, resilient material, such as a silicone rubber, or other suitable material.

An additional object of the invention is to provide an improved fishing lure including a bill extending from the front of the forward body portion, for producing turbulence in the water as the lure is drawn along the surface of the water.

Still another object of the invention is to provide an improved fishing lure which interchangeable tail portion may be impregnated with fish attracting scent and/or taste substances.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a fishing lure having a rearward tail portion which is interchangeably attachable to a forward body portion. A series of different tail components is preferably provided with the present lure, with the tail portions differing according to color, shape, etc., or perhaps according to the scent or taste of various fish attracting substances with which the tail has been impregnated. The angler using the present lure may exchange one of the tail components for another such component as desired, in order to attract different species of fish, and/or to attract fish under varying conditions as desired.

Figure 1:
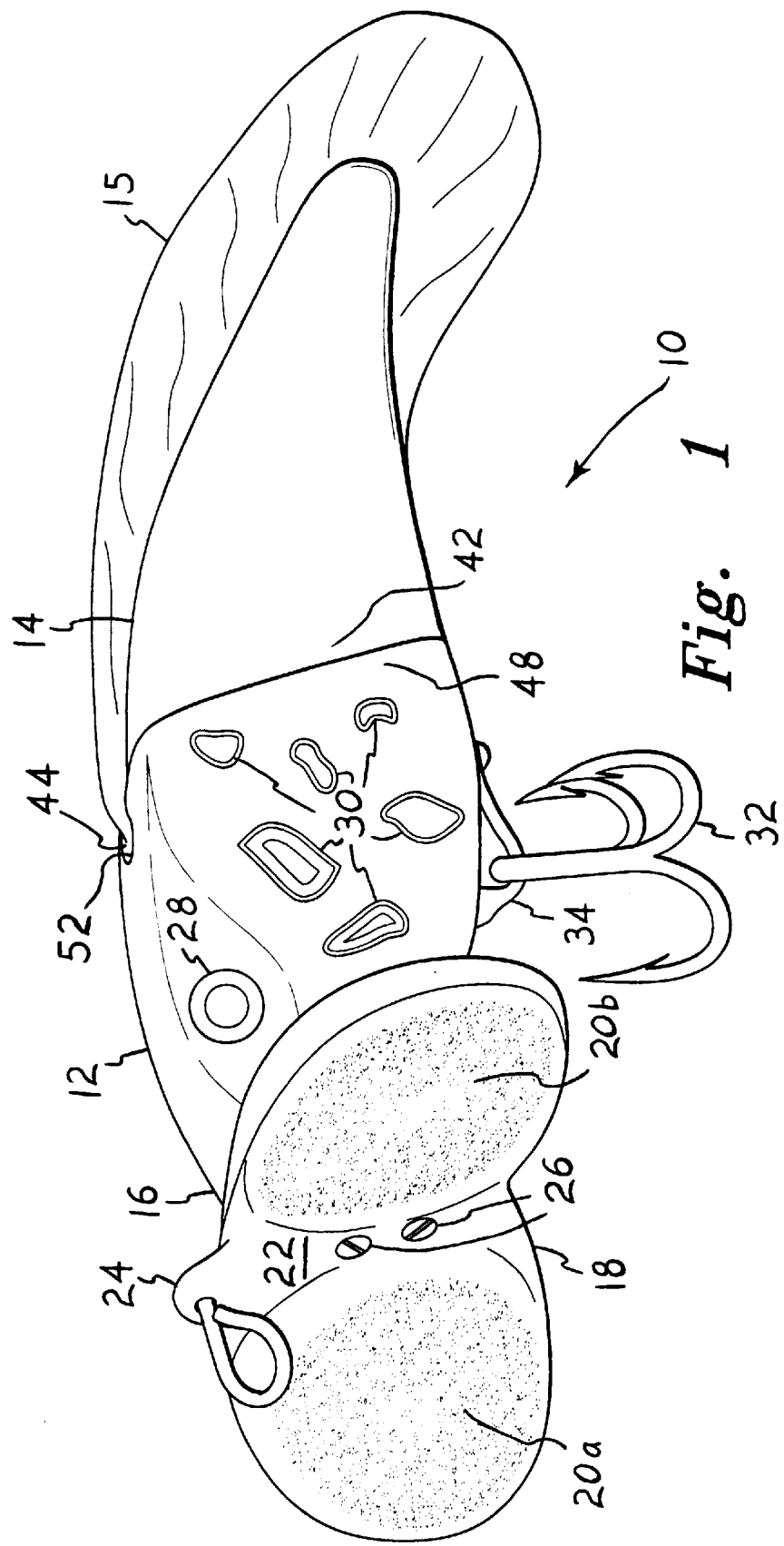
FIG. 1 is a front and left side perspective view of the present fishing lure, showing its various features.

FIG. 1 provides a front and left side view of the present lure, designated by the reference numeral 10 throughout the drawings. The lure 10 has a forward body portion 12 preferably formed of a hard, rigid plastic material, although other materials providing similar properties may be used as desired. A rearwardly disposed tail portion 14 is removably secured to the body portion 12, as described further below. The tail portion 14 is preferably formed of a soft, resilient material to provide flexibility and the appearance of realistic hydrodynamic action as the lure 10 is drawn through the water. A soft silicone rubber material, as used in the manufacture of artificial bait such as worms and the like, may be used to form the tail portions 14 of the present lure 10, or other materials having suitable properties may be used as desired.

The forward, main body portion 12 of the lure 10 has a forward end 16 which includes a "bill" 18, or hydrodynamic device, extending laterally thereacross. The bill 18 serves to create turbulence in the water, as the lure 10 is drawn through the water while fishing. The bill 18 is formed from a thin, laterally symmetrical plate of material (various hard plastics, e. g., Lexan, tm, or metals, e. g., aluminum) with opposed forwardly cupped or concave first and second sides, respectively 20a and 20b, extending from a generally flat central area 22 which serves for attaching the bill 18 to the forward end 16 of the body portion 12 of the lure 10. The bill 18 is angled to face generally forwardly and downwardly, to provide at least a slight lifting action, as well as turbulence and sound, when the lure 10 is drawn through the water.

The bill 18 also preferably includes some means of securing a fishing leader or line thereto, and consequently to the remainder of the lure 10. This leader attachment means 24 comprises an eye or passage which is formed through the upper central portion of the bill 18, with a swivel or loop of wire or other suitable material being secured through the eye. The bill 18 may be secured to the forward end 16 of the body portion 12 by any suitable means, such as conventional threaded fasteners 26 (screws, etc.) threaded into the hard material of the forward body portion 12, as shown in FIG. 1, or by conventional waterproof adhesives (various resins, etc.), plastic welding, etc., as desired.

Figure 2:
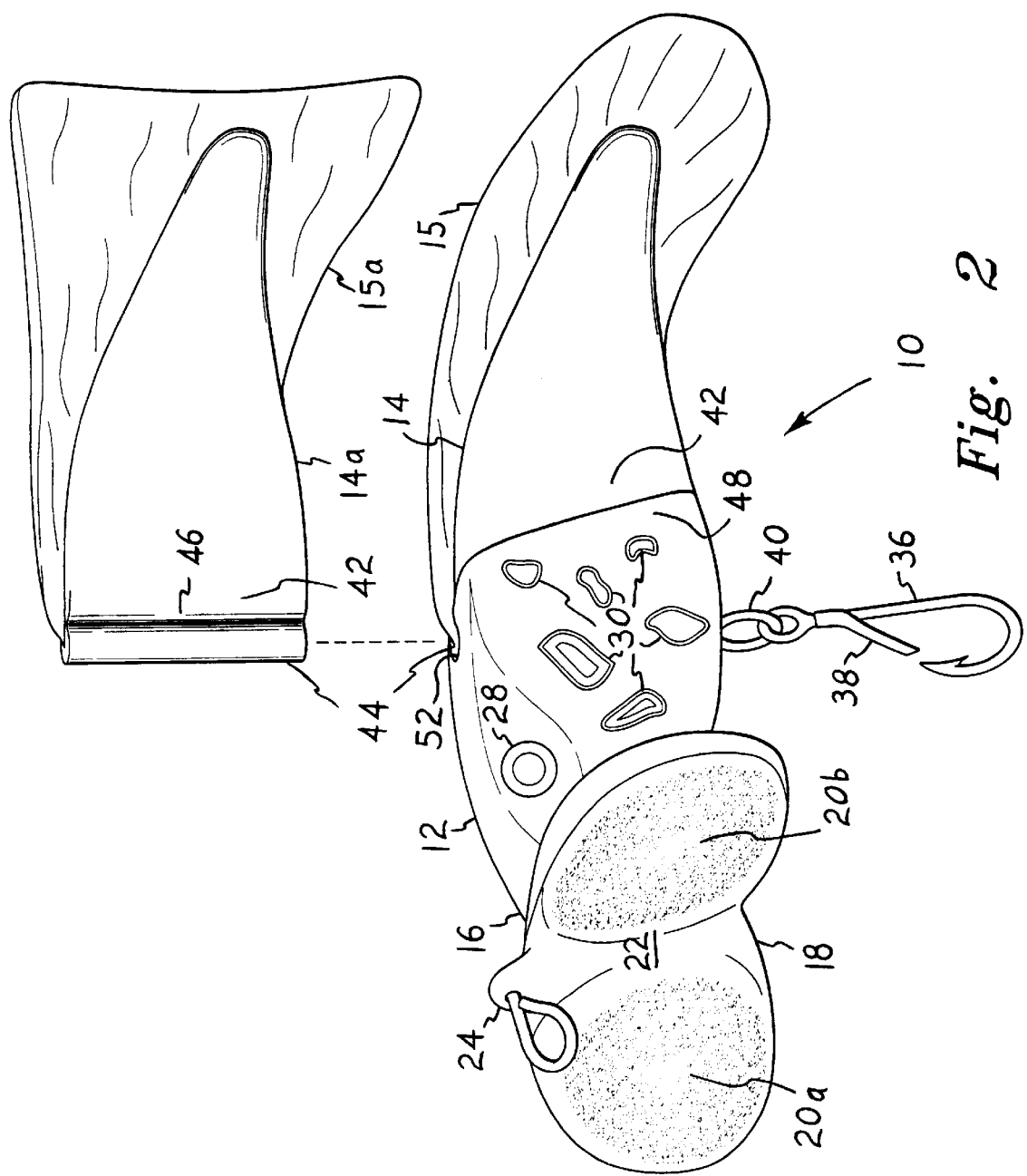
FIG. 2 is a perspective view similar to the view of FIG. 1, showing the interchangeable installation of different tail portions to the forward body portion of the lure.

The forward body portion 12 of the present lure 10 also preferably includes fish attracting means thereon, such as artificial eyes 28 and/or other brightly colored markings 30 thereon. Such eyes 28 and markings 30 may be provided in any desired pattern, depending upon such patterns which have been found to attract various types of fish under various conditions. The solid, hard plastic of the body portion 12 also provides an attachment point(s) for one or more hooks thereon. In FIG. 1, a single treble hook 32 extends from a hook attachment retainer or hanger 34, while an alternative is shown in FIG. 2 comprising a single hook 36 with a weed guard 38 extending from a hook attachment eye 40, which is in turn imbedded into the hard shell of the forward body portion 12. It will be seen that additional hooks, and/or hook configurations, may be installed on the present lure forward body portion 12, as desired.

FIG. 2 also illustrates the interchange of a first tail portion 14 with a second alternative tail portion 14a having a different fin shape 15a from the fin 15 of the tail 14. As noted further above, different tail portions may include different characteristics, with the ready interchangeability of the tail portions allowing an angler to customize the lure 10 to attract a specific species of fish under specific conditions. For example, the tail portion 14a and fin 15a may be a different color or tint than the tail 14 and fin 15, and/or may be conventionally impregnated or saturated with fish attracting scents and/or flavors which encourage a fish to hold the lure 10 after a strike. A series of different tail portions each having different and distinct characteristics may be provided with the forward body portion 12 of the present lure 10, enabling an angler to assemble a tail portion having just the desired characteristics with the body portion 12.

Figure 3:
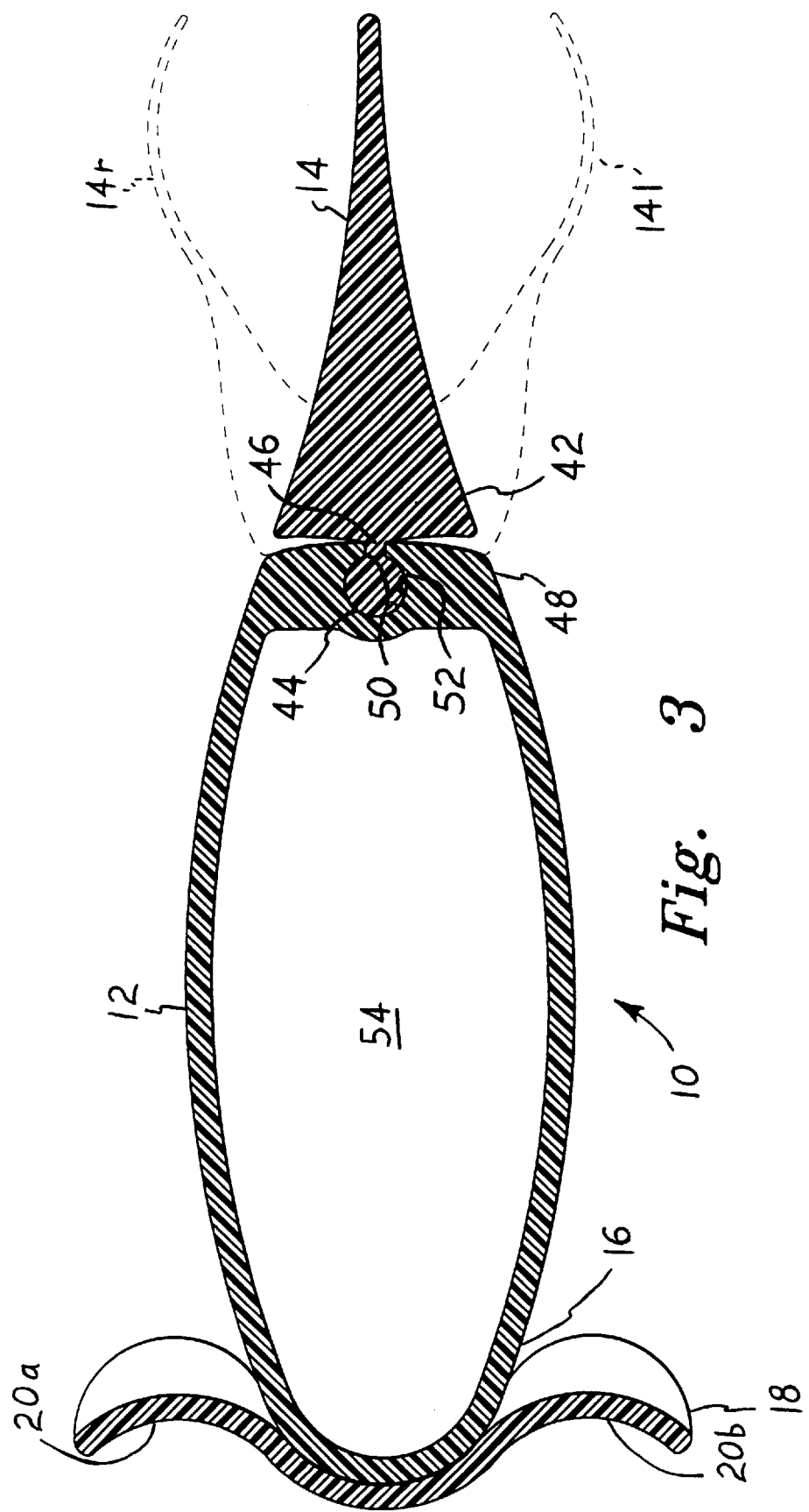
FIG. 3 is a top plan view in section of the present lure, showing the hollow forward body portion and hydrodynamic action of the tail when the lure is drawn through the water.

FIGS. 2 and 3 illustrate the means used for installing and securing one of the tail components to the body portion 12 of the lure 10. The forward end(s) 42 of the tail portions 14 (14a, etc.) each include an elongated attachment 44 having a rounded, generally bulb-shaped cross section extending from a relatively narrower flange 46. The rearward portion 48 of the body component 12 includes a complementary, mating slot 50 with a relatively wider and rounded interior socket 52 formed therein. The tail attachment 44 and slot and socket 50 and 52 of the forward body portion 12 are oriented along generally vertical axes, to provide realistic action.

The bulb-shaped extension 44 of the tail portion(s) 14 (14a) is inserted into the socket 52, which firmly grips the extension 44 to hold the tail in place. The soft, resilient nature of the bulb extension 44 of the tail 14 is gripped securely by the walls of the socket 52 of the body portion 12, with the high friction coefficient provided by the soft rubber to plastic interface of the two materials serving to preclude any inadvertent slippage of the two components 44 and 52 relative to one another. Yet, the elongate bulb attachment 44 of the tail portion 14 may be worked into the socket 52 of the body portion 12, or removed therefrom, reasonably easily by an angler in the field without the use of tools and without incurring damage to either the body portion 12 or the tail portion(s) 14 (14a, etc.).

The soft and flexible nature of the preferred material for the tail portion 14 of the present lure 10, provides considerable flexibility to simulate the natural oscillating movement of the tail of a small fish which might serve as prey for a game fish being sought by an angler. The relatively narrow flange 46 of the tail portion 14 not only serves to fit closely between the relatively narrow slot 50 of the body portion 12, but also serves as a live hinge, allowing the balance of the tail portion 14 to oscillate to the left and right, as indicated by tail positions 14l and 14r in FIG. 3 of the drawings. Yet, the bulb portion 44 of the tail 14 is gripped securely by the walls of the socket 52 of the body portion 12, and does not pivot or move relative thereto when installed therein.

The elevation view in section of FIG. 3 also discloses another feature of the present lure 10, i. e., the hollow center area 54 of the forward body portion 12. The use of relatively light weight materials, in addition to the hollow center area 54, provides buoyancy for the present lure 10, enabling it to float upon the surface of the water. An angler fishing with the present lure 10 need only draw the lure through the water to cause the bill portion 18 to produce turbulence and noise, which emulates the water turbulence and noise produced by many small animals which serve as prey for game fish. The action of the relatively high mounted leader to the leader attachment portion 24 of the bill 18, will tend to lift the front of the lure 10 slightly. The attachment angle of the bill 18 to the front of the lure body 12 also generates a lifting force. Thus, the present lure 10 will float upon the surface in a static mode, and will splash through or across the surface when momentarily rapidly drawn in by the angler using the present lure 10.

Movement of the lure 10 through the water also causes the flexible tail portion 14 to oscillate from side to side, thus providing even further realistic action as a fish approaches closely enough to see the lure 10. Finally, a fish is attracted sufficiently closely to catch the scent with which the tail portion 14 may be saturated, thus inciting the fish to strike the lure 10. The taste attractant applied to the tail portion 14 serves to stimulate the biting action of the fish, thereby assuring that the fish will take the hook.

In summary, the present fishing lure 10 with its interchangeable tail, provides an angler with a much needed means of quickly and easily adapting to different types of fish and/or different conditions as required, without need to carry a large number of different lures with their accompanying hooks, etc. Anglers who wish to travel light will greatly appreciate the present lure, as will anyone who wishes to simplify their fishing hobby. The replaceable tails enable an angler to customize the lure body as desired, to provide an efficient fish attracting device regardless of the type of fish sought or the conditions. The replaceable tail portions of the present lure also enable an angler to discard a tail portion which has been damaged or worn due to use, and/or which has lost its fish attractant scent or taste. Thus, the present lure may be made essentially "new" by merely replacing the tail portion in a few seconds, rather than requiring the angler to purchase an entirely new lure.

It is to be understood that the present invention is not limited to the sole embodiment described above, but encompasses any and all embodiments within the scope of the following claims.

I claim:

1. A kit having a fishing lure including a plurality of interchangeable tail components, said kit comprising:
   a forward body portion formed of a hard and rigid material, said forward body portion having a forward end;
   a plurality of rearward tail portions each formed of a soft and resilient material;
   a bill extending from said forward end of said forward body portion, said bill including a plate extending symmetrically across said forward end and facing generally forwardly and downwardly relative to said forward end, said bill including opposed first and second sides, each of said first and second sides having a generally concave area, and said bill further including a generally flat central area between each said concave area;
   means for fixedly attaching said generally flat central area of said bill to said forward end of said forward body portion;
   said forward body portion having a rearward end defining a slot, said slot having a widened interior formed therein along a generally vertical axis; and
   each one of said tail portions including a forward end including a bulbed attachment extending therefrom along a generally vertical axis for removably and interchangeably securing a selected one of said tail portions to said body portion by an angler in the field without the use of tools and without incurring damage to said body portion and said tail portions;
   wherein said slot frictionally retains said bulbed attachment of one of said tail portions for selectively interchangeably attaching each one of said tail portions to said forward body portion.

2. The kit according to claim 1, wherein each of said tail portions includes means for attracting fish selected from the group consisting of color, scent, and taste attractants.

3. The kit according to claim 1, wherein said forward body portion is hollow and buoyant.

4. The kit according to claim 1, wherein said forward body portion is formed of plastic, and said tail portion is formed of silicone rubber.

5. The kit according to claim 1, wherein said bill further includes an upper central area including means for attaching a leader.

6. The kit according to claim 1, wherein said bill is formed of materials selected from the group consisting of metal and plastic.

7. The kit according to claim 1, wherein said means for fixedly attaching said generally flat central area of said bill to said forward end of said forward body portion being selected from the group consisting of threaded fasteners and adhesives.

8. A fishing lure, comprising:
   a forward body portion, said forward body portion having a forward end;
   a bill extending from said forward end of said forward body portion, said bill including a Plate extending symmetrically across said forward end and facing generally forwardly and downwardly relative to said forward end, said bill including opposed first and second sides, each of said first and second sides having a generally concave area, and said bill further including a generally flat central area between each said concave area;

means for fixedly attaching said generally flat central area of said bill to said forward end of said forward body portion;

at least one rearward tail portion; and said forward body portion and said tail portions each including cooperating means for removably and interchangeably securing said at least one tail portion to said body forward portion, said at least one tail portion having a forward end including a bulbed attachment extending therefrom along a generally vertical axis, and said forward body portion having a rearward end slot, said slot having a widened interior formed therein along a generally vertical axis, for frictionally retaining said bulbed attachment of each one of said at least one tail portions for selectively and interchangeably attaching said at least one tail portions to said forward body portion.

9. The fishing lure according to claim 8, wherein said forward body portion is formed of a hard and rigid material, and each said at least one tail portion is formed of a soft and resilient material.

10. The fishing lure according to claim 8, wherein each of said at least one tail portion includes means for attracting fish selected from the group consisting of color, scent, and taste attractants.

11. The fishing lure according to claim 8, wherein said forward body portion is hollow and buoyant.

12. The fishing lure according to claim 8, wherein said forward body portion is formed of plastic, and each said at least one tail portion is formed of silicone rubber.

13. The fishing lure according to claim 8 wherein said bill further includes an upper central area including means for attaching a leader.

14. The fishing lure according to claim 8 wherein said bill is formed of materials selected from the group consisting of metal and plastic.

15. The fishing lure according to claim 8 wherein said means for fixedly attaching said generally flat central area of said bill to said forward end of said forward body portion being selected from the group consisting of threaded fasteners and adhesives.

* * * * *